US008886457B2

(12) United States Patent
Brandt (10) Patent No.: US 8,886,457 B2
(45) Date of Patent: Nov. 11, 2014

(54) MOBILE STATE DETERMINATION OF LOCATION AWARE DEVICES

(75) Inventor: Eli U. Brandt, Seattle, WA (US)

(73) Assignee: Google Inc., Mountain View, CA (US)

( * ) Notice: Subject to any disclaimer, the term of this patent is extended or adjusted under 35 U.S.C. 154(b) by 320 days.

(21) Appl. No.: 13/077,708

(22) Filed: Mar. 31, 2011

(65) Prior Publication Data

US 2012/0253656 A1   Oct. 4, 2012

(51) Int. Cl.
*G01C 21/36* (2006.01)
*G01C 21/20* (2006.01)
*G01C 21/34* (2006.01)

(52) U.S. Cl.
CPC ............ *G01C 21/3484* (2013.01); *G01C 21/20* (2013.01)
USPC .......... 701/444; 701/408; 701/423; 701/433; 455/572; 455/344; 455/345

(58) Field of Classification Search
None
See application file for complete search history.

(56) References Cited

U.S. PATENT DOCUMENTS

| | | | |
|---|---|---|---|
| 5,005,198 A * | 4/1991 | Toda | 455/573 |
| 5,036,532 A * | 7/1991 | Metroka et al. | 455/566 |
| 6,333,703 B1 | 12/2001 | Alewine et al. | |
| 6,385,539 B1 | 5/2002 | Wilson et al. | |
| 7,221,928 B2 * | 5/2007 | Laird et al. | 455/404.1 |
| 7,536,190 B1 | 5/2009 | Creemer | |
| 7,557,730 B2 | 7/2009 | Gueziec | |
| 7,701,363 B1 | 4/2010 | Zlojutro | |
| 7,912,628 B2 | 3/2011 | Chapman et al. | |
| 8,000,892 B2 | 8/2011 | Banerjee | |
| 8,099,236 B2 | 1/2012 | Olson et al. | |
| 8,103,439 B2 * | 1/2012 | Onishi et al. | 701/410 |
| 8,160,805 B2 | 4/2012 | Downs et al. | |
| 8,260,542 B2 * | 9/2012 | Kimishima | 701/400 |
| 8,275,490 B2 | 9/2012 | Brusilovsky et al. | |
| 8,386,157 B2 | 2/2013 | Kim | |
| 2004/0002366 A1 * | 1/2004 | Cromer et al. | 455/574 |
| 2004/0097275 A1 * | 5/2004 | Ohno et al. | 455/572 |
| 2004/0102893 A1 | 5/2004 | Atkinson et al. | |
| 2004/0204840 A1 * | 10/2004 | Hashima et al. | 701/209 |

(Continued)

FOREIGN PATENT DOCUMENTS

| | | |
|---|---|---|
| JP | 2005-283386 A | 10/2005 |
| JP | 2009-109400 A | 5/2009 |

OTHER PUBLICATIONS

Lester, Jonathan, "MobileSense—Sensing Modes of Transportation in Studies of the Built Environment," International Workshop on Urban, Community and Social Applications of Netwerked Sensing Systems, Nov. 4, 2008.*

(Continued)

*Primary Examiner* — Thomas Tarcza
*Assistant Examiner* — Richard Goldman
(74) *Attorney, Agent, or Firm* — Fenwick & West LLP (57) ABSTRACT

Systems and methods are provided for determining the mode of travel of a location aware device. Data from the location aware device is received, which includes location aware data about the speed, location, and navigational route of the location aware device and data about the connection of the location aware device to a power source. These features of data from the location aware device are used to determine the mode of travel of the location aware device. The data from the location aware device can also be used to determine preferred routes of navigation, speed of roads, and traffic on roads.

60 Claims, 5 Drawing Sheets

(56) References Cited

U.S. PATENT DOCUMENTS

| | | | |
|---|---|---|---|
| 2007/0038364 A1* | 2/2007 | Lee et al. | 701/200 |
| 2007/0072553 A1* | 3/2007 | Barbera | 455/67.11 |
| 2008/0033635 A1 | 2/2008 | Obradovich et al. | |
| 2008/0082254 A1 | 4/2008 | Huhtala et al. | |
| 2008/0234921 A1 | 9/2008 | Groenhuijzen et al. | |
| 2008/0300782 A1* | 12/2008 | Kohno et al. | 701/207 |
| 2008/0312819 A1 | 12/2008 | Banerjee | |
| 2009/0029687 A1 | 1/2009 | Ramer et al. | |
| 2009/0281719 A1 | 11/2009 | Jakobson | |
| 2010/0125409 A1* | 5/2010 | Prehofer | 701/207 |
| 2010/0156709 A1* | 6/2010 | Zhang et al. | 342/357.04 |
| 2011/0015817 A1* | 1/2011 | Reeve | 701/25 |
| 2011/0106416 A1 | 5/2011 | Scofield et al. | |
| 2011/0199259 A1* | 8/2011 | Karaoguz et al. | 342/357.28 |
| 2011/0224898 A1 | 9/2011 | Scofield et al. | |
| 2012/0021717 A1* | 1/2012 | Schmidt | 455/404.2 |
| 2012/0053823 A1* | 3/2012 | Wilson | 701/119 |
| 2012/0109517 A1* | 5/2012 | Watanabe | 701/431 |
| 2012/0115505 A1 | 5/2012 | Miyake et al. | |
| 2012/0253656 A1* | 10/2012 | Brandt | 701/410 |
| 2012/0303271 A1* | 11/2012 | Chowdhary et al. | 701/433 |
| 2012/0316774 A1* | 12/2012 | Yariv et al. | 701/423 |
| 2012/0330544 A1* | 12/2012 | Joong et al. | 701/408 |
| 2013/0006517 A1 | 1/2013 | Ofek et al. | |

OTHER PUBLICATIONS

Welbourne, Evan, "Mobile Context Inference Using Low-Cost Sensors," T. Strang and C. Linnhoff-Popien: LoCA 2005, 2005.*

PCT International Search Report and Written Opinion, PCT/US2012/030978, Oct. 28, 2012, 8 Pages.

"Path Tracker", Pathtracks.com, 2 pages, [online] [retrieved on Mar. 31, 2011] retrieved from the internet <URL:http://pathtracks.com/>.

"Global Positioning System" Wikipedia, Last Modified on Mar. 28, 2011, 17 Pages, [online] [retrieved on Mar. 31, 2011] retrieved from the internet <URL:http://en.wikipedia.org/wiki/Global_Positioning_System>.

Schussler, N., et al., "Identifying trips and activities and their characteristics from GPS raw data without further information" 8th International Conference on Survey Methods in Transport, Annecy, May 2008, pp. 1-28.

Stopher, P., et al., "Deducing mode and purpose from GPS data" Institute of Transport and Logistics Studies, Apr. 2008, pp. 1-13.

Upadhyay, et al., "Optimal parameter values for mode detection in GPS post-processing: An experiment" Working Paper, 507, IVT, ETH Zurich, Zurich, Jul. 2008, 23 Pages.

* cited by examiner

MOBILE STATE DETERMINATION OF LOCATION AWARE DEVICES

BACKGROUND

1. Field of the Invention

The present invention relates generally to methods and systems for the determination of the modes of travel of location aware devices.

2. Description of the Related Art

Location aware devices are portable, electronic devices that can provide their use with information about their current location. Location aware devices such as Global Navigation Satellite System (GNSS) devices communicate with satellites to determine the precise location of the GNSS device. GNSS devices are commonly used in navigation and route guidance systems and have been included in a variety of consumer products ranging from vehicles to mobile devices. GNSS devices can provide useful information about the location and routes of users.

Providers of maps and navigational services use the information provided by the user's GNSS device to provide directions, routing, and locale information. If the provider has information about the user's mode of travel, such as whether the user is walking, biking, or driving in car, then the provider can use that information to offer results that take that mode of travel into account. However, using conventional methods, it is difficult to automatically determine whether a user of a GNSS device is walking, biking, or driving a car, and instead, providers either explicitly ask the user to identify the mode of travel, or simply assume—sometimes incorrectly—what is the current mode of travel. Either of these approaches can lead to error.

SUMMARY

Data received from a plurality of location-aware devices, such as GNSS devices, are collected and analyzed to determine the modes of travel of the GNSS devices. Data from the GNSS devices can include the information about the power source of the GNSS device, such as whether the GNSS device is connected to an external power source. Data can also include GNSS data about the speed, location, or direction of travel of the GNSS device.

In one embodiment, the mode of travel can be determined based at least in part on the power source of the GNSS device. If the GNSS device is connected to an external power source, the mode of travel can be determined to be a vehicle.

The speed of the GNSS device can be calculated and used to determine the mode of travel, such as walking, biking or driving a vehicle. One or more speed thresholds can be established, and a speed greater than a threshold amount can indicate travel by vehicle; a speed below or between certain thresholds can indicate travel by bicycle; and a speed below a certain threshold can indicate travel by walking. In some instances, an average speed or an estimated speed based on a percentile value of a speed probability distribution can be used to determine modes of travel. In other embodiments, a speed or a velocity of the GNSS device is received directly from the GNSS device and used to determine the mode of travel.

Additional data can be analyzed about the route traveled by the GNSS device during a definite period of time. The route of the GNSS device can be compared with map data or known navigational routes to determine the mode of travel. Where the route is determined to be a highway, then the mode of travel is determined to be by vehicle. Where the route is determined to be a bicycle path, then the mode of travel is determined to be by bicycle. Where the route is determined to be a walking path or other non-vehicular pathway (e.g., a route through a park), then the mode of travel is determined to by walking.

In some embodiments, the connection to a power source, location, speed and/or velocity, and the navigational route can be analyzed together to determine the mode of travel of the device.

The modes of travel of the plurality of GNSS devices can be used in various applications. One application is to determine preferred routes of travel. Another application is to determine preferred navigation directions in response to a navigation request. Another application is to determine the average speed of certain routes. Another application is to determine average traffic conditions on certain routes.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of the present invention provide systems, methods, and computer-readable storage media for determining modes of travel of users of location aware devices. The embodiments described herein will be discussed with respect to GNSS devices, but it should be understood that other types of location aware devices, using non-GNSS type technologies may be used as well. Non-GNSS devices can use information to determine location, such as location based services (LBS), including network-based, handset-based, SIM-based, and hybrid methods, using for example, triangulation, multi-lateration, cell or network identification, radio signal analysis, dead reckoning methods, including inertial navigation systems, or other non-geo-spatial satellite technologies.

Figure 1:
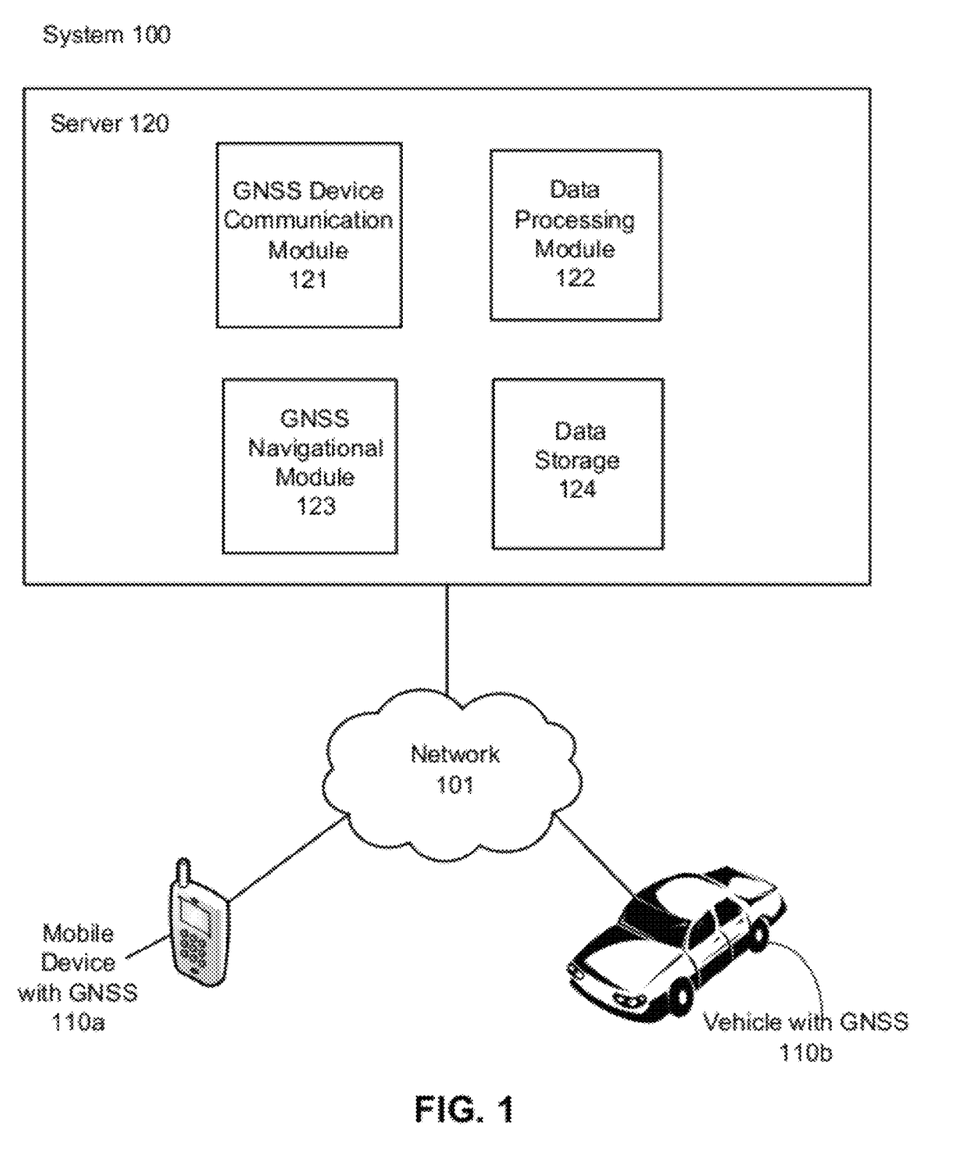
FIG. 1 is a high-level block diagram of a system environment, in accordance with an embodiment of the invention.

FIG. 1 is a block diagram of a system environment 100 in accordance with one embodiment. As illustrated in FIG. 1, the system environment 100 includes a network 101, at least one location aware device, such as GNSS device 110 and a server 120. The server 120 includes a GNSS device communication module 121, a data processing module 122, a GNSS navigational module 123, and a data storage 124.

The network 101 represents the communication pathways between the server 120 and the GNSS devices 110. In one embodiment, the network 101 is the Internet and uses standard communications technologies and/or protocols. The network 101 can also utilize dedicated, custom, or private communications links that are not necessarily part of the Internet.

The system environment 100 includes at least one location aware device, such as GNSS device 110, such as a mobile device with GNSS 110a or a vehicle with a GNSS receiver 110b. The mobile device with GNSS 110a can be any mobile device equipped with GNSS, such as a smart phone or personal digital assistant (PDA), or a dedicated GNSS receiver/transmitter. Thus, a user may carry a GNSS device 110a while walking, bicycling, or driving in a vehicle. FIG. 1 illustrates two GNSS devices 110 for clarity; in practice, there will be hundreds and likely thousands of GNSS devices 110 from which GNSS data is received. The vehicle with GNSS 110b can be any vehicle equipped with a GNSS receiver (either OEM or after-market), such as a car, truck, motorcycle, bus, or fleet vehicle.

The GNSS devices 110 include a GNSS receiver chipset. The GNSS receiver chipset receives several sources of differential signals, such as a wide-area augmentation system (WAAS), subscription L-Band signals, or a combination of signal options. The GNSS device 110 is composed of an antenna that is tuned to the frequencies transmitted by satellites, receiver-processors, and a highly stable clock. The GNSS device 110 may include a display for providing location and speed information to the user.

The term "GNSS device" refers to devices that communicate the location, speed, and/or direction of travel through geo-spatial position satellites. For example, a mobile device, vehicle, or other transportation unit can use the Global Positioning System (GPS), the GLONASS system (a Russian radio-based satellite navigation system), the Chinese COMPASS and BeiDou navigation systems, the Galileo positioning system of the European Union (EU), or the Indian Regional Navigational Satellite System of India.

The GNSS device communication module 121 communicates with a plurality of GNSS devices 110 and receives data from the plurality of GNSS devices 110. Data received from a GNSS device 110 can include GNSS data about the location, speed, direction of travel, and/or velocity of the GNSS device 110. Data can also include information about the power source of the GNSS, specifically whether the GNSS device 110 is connected to an external power source or operating on battery power. The data can also include information about whether the device is physically held by a user. The GNSS device communication module 121 can be configured to receive data from various types of GNSS devices 110. In one embodiment, the data can include identifying information about the GNSS device 110. In certain embodiments, the GNSS device communication module 121 can remove the identifying information upon receipt of the data from the GNSS device 110. The data can be sent to the data processing module 122, the GNSS navigational module 123, or stored in the data storage 124.

The GNSS device communication module 121 can receive the data from GNSS devices 110 at regular intervals. In some embodiments, the regular intervals can be once per second, once every few seconds, once per minute, or other intervals of time. In another embodiment, the data can be collected more frequently than once per second. In other embodiments, the data is received according to a specific upload pattern. The GNSS device communication module 121 can receive data from a vehicle at every 100 meters traveled by the vehicle. In some embodiments, the data is collected in short intervals or bursts, such that there is a dense sampling of data in a short time period. In another example, the data is received at a faster rate than the rate that data is sent back to the GNSS device 110.

In some embodiments, the GNSS device communication module 121 receives the data from a vehicle in an upload pattern that is different from the upload pattern of a mobile device, such as a smartphone or other personal device. For instance, data from a vehicle may be received at regular intervals followed by short bursts, whereas samples of data from mobile devices may be received only at regular intervals. The data from the GNSS device 110 is communicated to the server 120 via the network 101, and the GNSS device communication module 121 can send data received from the respective GNSS devices 110 to the data processing module 122.

The operations of data collection can be repeated with respect to a large number of GNSS devices 110 over an extended period of time, such as an hour, a day, a week, etc., depending on the particular application for which the collected information is to be used. For example, a system administrator can configure the server 120 to collect several hundred or thousands of samples of data from numerous GNSS devices 110 passing through a given street intersection over a one week period. In addition, a large sample of data can be collected and stored from multiple GNSS devices, and then subsequently analyzed to determine the mode of travel of each of the GNSS devices 110. Similarly, multiple threads can be operating concurrently to collect, analyze, and store the data.

In some embodiments, the data received from a GNSS device 110 includes information about the power source of the GNSS device, such as whether or not the device is connected to an external power source or operating on battery power. The GNSS device 110 can include a client-side application that determines the power source of the GNSS device, for example, by querying an application programming interface of the device's power manager or operating system. Alternatively, the client-side application can determine the voltage level from the power source and use that information to infer the type of power source. The client-side application sends data about the power source to the GNSS device communication module 121, indicating whether the power source is external or internal (e.g., battery). If the power source is the internal battery of a mobile device, the client-side application sends data indicating that the GNSS device 110 is not connected to an external power source.

In other embodiments, the data includes information about whether the GNSS device 110 is held by a user (e.g., an orientation sensor, touch sensor or the like). A sensor in the GNSS device 110 can detect whether the GNSS device 110 is held in a steady motion or jostled by the user. For example, a GNSS device 110 that is being jostled can indicate that the user of the GNSS device 110 is walking or running, rather than riding in a vehicle.

The data processing module 122 receives data about whether the GNSS device 110 is connected to an external power source from the GNSS device communication module 121 or from the data storage 124 to determine the mode of travel. In some embodiments, the data processing module 122 receives data about whether the GNSS device 110 is temporarily attached or permanently attached to the external power source. If the GNSS device 110 is attached to an external power source, the data processing module 122 determines that the GNSS device 110 is a mobile device that is connected to a vehicle. In one embodiment, the GNSS device 110 can maintain information in a log indicating how long the device is continuously connected to an external power source; if the device is continuously connected for an extended period of time (e.g., at least 15 days), then the device 110 can determine that it is permanently installed in a vehicle. The data processing module 122 can determine based on the power source data that the user of the GNSS device 110 is using a vehicle as the mode of travel. If the data indicates that the GNSS device 110 is not connected to an external power source, then the data processing module 122 determines that the GNSS device 110 is a mobile device and that the user of the GNSS device 110 is likely to be walking or using a non-vehicular mode of travel. Thus, the data processing module 122 can use power source data (and optionally, the length of time connected to an external power source) to determine the mode of travel of the GNSS device 110.

In addition, the data processing module 122 can determine the mode of travel for a GNSS device 110 based on GNSS data. The GNSS data received from a GNSS device 110 generally includes information from which can be determined a location of the GNSS device 110 and the time at which the GNSS device 110 was at the particular location. The data may be packaged in any suitable format, including GPX, CGGTTS, USNO, NMEA, and so forth. The location data includes the latitude and longitude of the GNSS device 110. Based on the GNSS information, the GNSS device communication module 121 can use map data to determine the exact location of the GNSS device 110 on a map.

The GNSS data may also include the direction of travel of the GNSS device 110. The direction may be relative to points on a fixed compass, such as cardinal points (north, south, east and west) or intermediate directions (northeast, southeast, southwest, northwest) or headings. Alternatively, the direction data may include information about the degrees of rotation relative to a 360 degree compass. For instance, a vehicle facing directly east can correspond to a direction of 90 degrees.

The GNSS data can include the speed of travel of the GNSS device 110. In one embodiment, the speed of the GNSS device 110 is reported directly from the GNSS device 110. The speeds can be sent by the GNSS device 110 continuously or over an interval of time. In other embodiments, the speeds of the GNSS device 110 are calculated by the data processing module 122 based on the change of location of the device. In some cases, the reported speeds and the calculated speeds are used together to determine a probability speed distribution or an average speed of the GNSS device 110, which is described in detail herein. In another embodiment, the GNSS data includes the velocity of the GNSS device 110, which includes the speed and the heading of the GNSS device 110. The velocity of the GNSS device 110 can also be determined based on a reported or calculated speed and a direction of travel.

Once data is received from a GNSS device 110, the data processing module 122 can associate GNSS data for a GNSS device 110 with a road segment on a map. A road segment can be a portion of a road between two adjacent intersections. The term "road segment" also includes a portion or all of a walking path, biking path, transportation route, roadway or highway. Alternatively or additionally, a road segment can be defined by a specific length (e.g., a road segment is 100 meters long). The data processing module 121 can also associate the device's GNSS data with a road, street, highway, walking path, or other transportation route. The association serves to establish which GNSS data are associated with which roads or pathways, thereby building up a collection of data that can be used to characterize travel along such roads. In other embodiments, the association of GNSS data to a road segment can be performed in conjunction with storing the GNSS data in the database.

In some embodiments, the association of the GNSS data to a road is based upon the calculation of a log probability for the GNSS data based on a Gaussian assumption for distance and direction. The probability of the association of GNSS data (or a sample of GNSS data) to a road segment is calculated by the computation:

$$\log P(d/d_{error}) + \log P(\theta/\theta_{error}) \quad \text{(Eq. 1)}$$

where P is the probability distribution of samples at a given distance, d is the distance of the sample in reference to the center line of the road (reference axis), and $\theta$ is the angle of the sample's direction in reference to the center line of the road (reference axis), and $d_{error}$ and $\theta_{error}$ are constants. P can be a Gaussian probability distribution, but any representative of the distribution of errors may be used. The best fit association score for a sample of GNSS data is determined by finding the minimum value for Eq. 1 for all roads that are situated nearby the GNSS data. If no roads are situated nearby the sample of GNSS data, no calculation for association is required. A sample of GNSS data is considered to be "nearby" a road segment if it is within a certain threshold distance (for example, within 20 meters).

In order to associate a sample of GNSS data to a road segment, the best fit score (corresponding to an association with one road segment, i.e. "best segment") is compared to the second best fit score (corresponding to an association with another road segment, i.e. "second best segment"). If the difference between the best fit score and second best fit score meets or exceeds a threshold, the sample of GNSS data is associated with the road segment with the best fit score. If not, the sample is discarded.

The required threshold difference between the scores for the best fit and second best fit is determined by the system designer. A difference of n in the log probability scores corresponds to the association to the best segment being n times more probable than the association to the second best segment. For example, if the log basis is 2 and the threshold difference is set to 1, this means that the sample of GNSS data is twice as likely to be associated with the best segment than with the second best segment. If the threshold difference is set to 3, then the sample of GNSS data is 8 times more probable to be associated with the best segment than with the second best segment. The threshold can be set empirically depending on the degree of accuracy of association desired and to the extent of how many samples of GNSS data are gathered (more GNSS samples means a higher threshold can be set to increase the accuracy of association). Once GNSS data is associated with a particular road or road segment, the GNSS data can be stored in the GNSS data storage 124.

The data processing module 122 can identify and select a plurality of GNSS data from a GNSS device 110 that are associated with a particular road segment, pathway, or route. The data processing module 122 can also identify and select a plurality of GNSS data from a GNSS device 110 received during a defined period of time (e.g., GNSS data received during a ten minute period of travel). The data processing module 122 may also select a plurality of GNSS data captured during a "trip" made by the user of a GNSS device 110 from one location to another location. A trip can be defined based on a user's request from the GNSS device 110 for a navigational route to a chosen destination and/or the user's movement from one starting location to an end-point destination.

Moreover, the mode of travel of a GNSS device 110 can be determined based on the speed of the device. The data processing module 122 analyzes the plurality of GNSS data to determine the speed of the GNSS device 110 at a location and uses this data to determine the mode of travel of the user of the GNSS device 110. The data processing module 122 can determine the speed of the GNSS device 110 based on the locations of the GNSS device 110 at two points in time ($t_0$ and $t_1$). The data processing module 122 can calculate the speed of the GNSS device 110 using the following calculation: s=d/t, where s is speed, d is the total distance traveled, and t is the difference of $t_1$-$t_0$. In other cases, the GNSS device 110 can provide the speed of the GNSS device 110 at each location.

The data processing module 122 can also calculate the average speed of the GNSS device 110 over a defined period of time or during a trip between two locations. The data processing module 122 can also determine the average speed of the GNSS device 110 from data points collected while the GNSS device 110 is moving (i.e., removing data points when GNSS device 110 is stopped or idle). Since the speeds of the GNSS device 110 vary (depending on traffic, stop-and-go movement, etc.), the average speed of the GNSS device 110 can be used to determine the mode of travel.

In another embodiment, the data processing module 122 can calculate an estimated speed for a GNSS device 110 based on speeds at various locations collected over a defined period of time. In one embodiment, the GNSS device 110 reports data about the speeds at various locations continuously or during a defined period of time. The calculated speeds and the reported speeds can be used together to determine the estimated speed of the GNSS device 110. The data processing module 122 compiles the speed data and calculates a speed distribution curve for the speeds of the device captured during a defined period of time. Then, a percentile value of the probability distribution is used to determine the estimated speed ("percentile speed") of the GNSS device 110. For example, the $80^{th}$ percentile value of the speed distribution (e.g., "$80^{th}$ percentile speed") can be used to determine the estimated speed of the GNSS device 110. Other percentages or statistical calculations can be used to determine the estimated speed of the GNSS device 110. The estimated speed is then used to determine the mode of travel of the GNSS device 110.

The data processing module 122 can compare the estimated speed of the GNSS device 110 to certain pre-determined thresholds or defined parameters for modes of travel. For instance, thresholds can be set for determining walking (e.g., less than 5 miles per hour (mph)), biking (e.g., between 5 and 15 mph, on average), or driving (e.g., greater than 15 mph). In one example, if the GNSS device 110 is traveling at a speed that is less than a threshold amount (e.g., 5 mph), then the data processing module 122 can determine that the mode of travel of the GNSS device 110 is walking. In another example, if the GNSS device 110 has a speed that is greater than a threshold amount (e.g., 30 mph), the mode of travel of the GNSS device 110 can be determined to be a vehicle (or in some cases, a mobile device held by a user traveling in a vehicle). In yet another example, if the GNSS device 110 has a speed in between two threshold amounts, the mode of travel of the GNSS device 110 can be determined to be a bicycle. Where there is an ambiguity in determining the mode of travel solely based on speed (i.e., the speed can be attributed to a slow-moving vehicle, fast biking, or running), other data from the GNSS device 110, such as power source data, navigational route, etc., can be used to determine the mode of travel.

The data processing module 122 may also calculate the acceleration of the GNSS device 110 to determine the mode of travel. The data processing module 122 can calculate the acceleration with the following formula: $A=(s_2-s_1)/t$, where A is acceleration, $s_2$ is the speed at $t_1$, $s_1$ is the $t_0$, and t is the difference of $t_1$-$t_0$. In some embodiments, the GNSS device 110 includes or is associated with an accelerometer (e.g., a mobile device with a built-in accelerometer) that directly measures the acceleration of the GNSS device 110 and sends the data to the GNSS device communication module 121 via the network 101.

The GNSS device 110 can then determine the mode of travel based on the determined acceleration. If the acceleration is above a predefined threshold, then the data processing module 122 determines that mode of travel is in a vehicle. For example, if the GNSS device 110 has a fast rate of acceleration greater than that which is capable by a human on foot or on a bicycle, e.g., greater than 3 m/s$^2$, then the data processing module 122 determines that the mode of travel is a vehicle. If the acceleration is below a pre-determined threshold, then the GNSS device 110 is likely to not be connected to a vehicle, and the user of the GNSS device 110 may be walking or riding a bike. The data processing module 122 can analyze the type of acceleration of the GNSS device 110. Certain types of acceleration can be used to determine the particular mode of travel (e.g., sustained acceleration at the start of movement can be associated with a vehicle). For instance, the GNSS data from the GNSS device 110 can indicate whether the acceleration is continuous or sporadic.

In some embodiments, the data processing module 122 can determine the mode of travel of the GNSS device 110 based on the navigational route of the device. The data processing module 122 communicates with the GNSS navigational module 123 and sends data about location, speed, etc., for the GNSS device 110. The GNSS navigational module 123 can use the GNSS data to map the navigational route of the GNSS device 110 over a defined period of time and analyze the route to determine the mode of travel of the GNSS device 110. The GNSS navigational module 123 can also provide a suggested route for a GNSS device 110 when a user requests directions to a queried location.

In one embodiment, the user of the GNSS device 110 can request directions for travel from a starting location (e.g., the location of the GNSS device 110) to a specified destination. The GNSS navigational module 123 can send a suggested navigational route to the GNSS device 110 via the GNSS device communication module 121. The GNSS navigational module 123 then receives GNSS data about the locations of the GNSS device 110 and determines the path traveled by the GNSS device 110 to the destination.

In certain embodiments, the GNSS navigational module 123 can determine the mode of travel by comparing the actual route traveled by the GNSS device 110 with the suggested navigational route. In one example, if the GNSS device 110 follows the designated route for a vehicle, then the GNSS navigational module 123 can determine that the mode of travel is a vehicle. If the GNSS device 110 does not follow the designated route for a vehicle, the GNSS navigational module 123 may determine that the mode of travel of the GNSS device 110 is not likely to be a vehicle. For example, if the GNSS device 110 follows a route of a walking path or travels on a one-way street in the wrong direction of travel, the user of the GNSS device 110 can be determined to be walking or riding a bike. The GNSS navigational module 123 can send this navigational data to the data processing module 122 for further analysis with other GNSS data or for storing at the GNSS data storage 124.

In other embodiments, the GNSS navigational module 123 can determine the route of a GNSS device 110 and compare the traveled route to extrinsic map data or known geographic information system (GIS) data about transportation routes. In some embodiments, the GNSS navigational module 123 can map or plot the actual locations of a GNSS device 110 captured over a period of time. The GNSS navigational module 123 can compare the route traveled by the GNSS device 110 with GIS data about transportation routes (e.g., roadways, highways, routes for buses or trains), biking paths, or walking paths. If the route of the GNSS device 110 matches closely with a known transportation route (e.g., a walking path or a highway), then the GNSS navigational module 123 can determine that the GNSS device 110 used the mode of travel associated with the transportation route. In other embodiments, a viewer of map can compare the mapped route of the GNSS device 110 with known map or GIS data about transportation routes to determine the mode of travel.

In another embodiment, the data processing module 122 can analyze multiple features of the data from a GNSS device 110 to determine the mode of travel. For example, the data processing module 122 can receive data that a GNSS device 110 is connected to a power source and determine that it has an average speed of 35 mph on a particular road. In that case, the data can be used to determine that the user of the GNSS device 110 is in a vehicle based on the faster speed of travel and the connection to a power source. The data processing module 122 can also receive data from the GNSS navigational module 123 about the route traveled by the GNSS device 110 during a given period of time along with the speed of travel and data about its connection to a power source. For example, the data processing module 122 may receive data that indicates the route of a GNSS device 110 matches closely with a known highway, the average speed of the GNSS device 110 is 60 mph, and the GNSS device 110 is connected to a power source. This data can indicate that the mode of travel is a vehicle. In another example, the data processing module 122 can receive data that the GNSS device 110 is traveling at 15 mph, and the GNSS device 110 is connected to a power source. This can indicate that the mode of travel is a slow-moving vehicle. In yet another example, the data processing module 122 can receive data that the GNSS device 110 is traveling at 5 mph and that the GNSS device 110 is not connected to a power source. This could indicate that the user of the GNSS device 110 is carrying the GNSS device 110 in a slow-moving vehicle or that the user is running (or biking) at 5 mph. In this case, the data processing module 122 can use additional data, such as the traveled route of the GNSS device 110, to determine whether the mode of travel is vehicular, pedestrian, or another mode of travel. Based on these features, the data processing module 122 can determine the mode of travel for a GNSS device 110.

In certain embodiments, the data processing module 122 can input multiple features of GNSS data into a training model to determine the modes of travel of the GNSS devices 110. A machine learning algorithm can be trained on a set of GNSS data associated with a GNSS device 110, where each sample of the GNSS data has a verified mode of travel (e.g., vehicular, pedestrian, etc.). The machine learning algorithm can be adjusted using various rules and coefficients to accurately predict whether the user of the GNSS device 110 is walking or riding in a vehicle. Once the machine learning algorithm has been trained on a known data set, the algorithm can be used for determining the mode of travel for other unverified GNSS devices 110. For example, the machine learning algorithm can receive as an input GNSS data from a plurality of GNSS devices 110. The machine learning algorithm analyzes the signals and outputs a determination of the determined mode of travel of the GNSS device 110.

In yet another embodiment, the data processing module 122 can receive GNSS data from an external application associated with the GNSS device 110. The external application can monitor the locations, speed, direction, and/or routes of travel of the GNSS device 110 and send the travel data to the data processing module 122. An example of an external application includes social traffic applications installed on a mobile device.

After a mode of travel has been determined, the data processing module 122 can associate the determined mode of travel with a road segment, road, route, or location. Using the association methods described above, the data processing module 122 can associate a plurality of data about the determined modes of travel of GNSS devices 110 with a given road segment or location. The collection of such data can be stored and used to characterize modes of travel along such roads or routes.

In addition, the GNSS data storage 124 stores data about the plurality of GNSS devices 110. In some embodiments, the GNSS data storage 124 receives and stores GNSS data from the GNSS device communication module 121 or from the data processing module 122. In one embodiment, the GNSS data storage 124 stores data about the determined modes of travel for GNSS devices 110 from the data processing module 122 and/or the GNSS navigational module 123.

Figure 2:
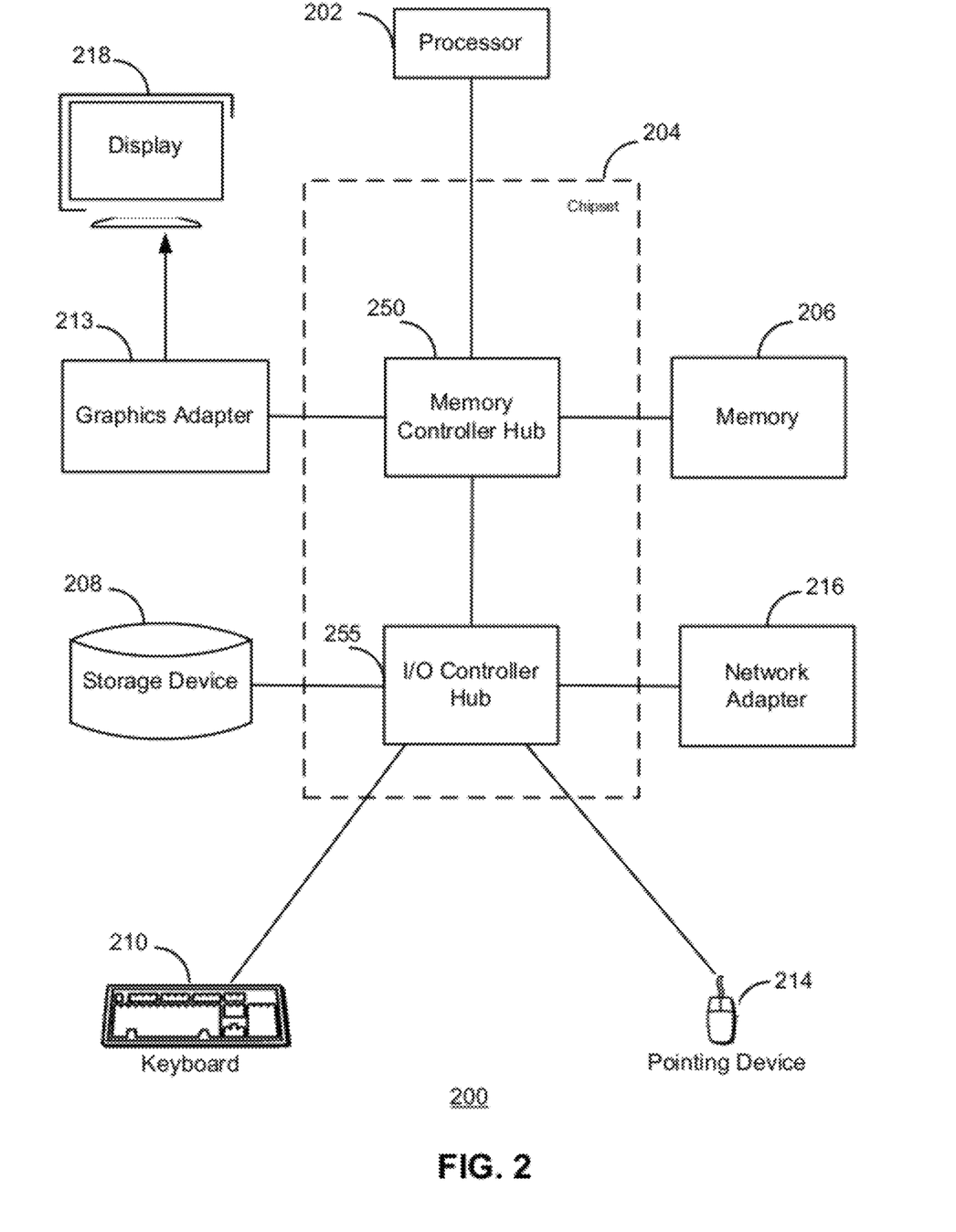
FIG. 2 is a high-level block diagram illustrating an example of a computer for use as a server, in accordance with an embodiment of the invention.

FIG. 2 is a high-level block diagram illustrating an example of a computer 200 for use as a server 120, in accordance with an embodiment of the invention. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. Mechanisms used to convey user input can include, but are not limited to, touchscreen interfaces, touchpads, directional pointing devices, voice controlled interfaces, hardware keyboard shortcuts, directional hardware keys and hardware elements such as wheels and rolling balls. The graphics adapter 213 displays images and other information on the display device 218. In some embodiments, the display device 218 includes a touch screen capability for receiving user input and selections. The network adapter 216 couples the computer system 200 to the communications network 101. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a server 120 may comprise multiple interconnected individual servers working together to provide the functionality described herein.

Figure 3:
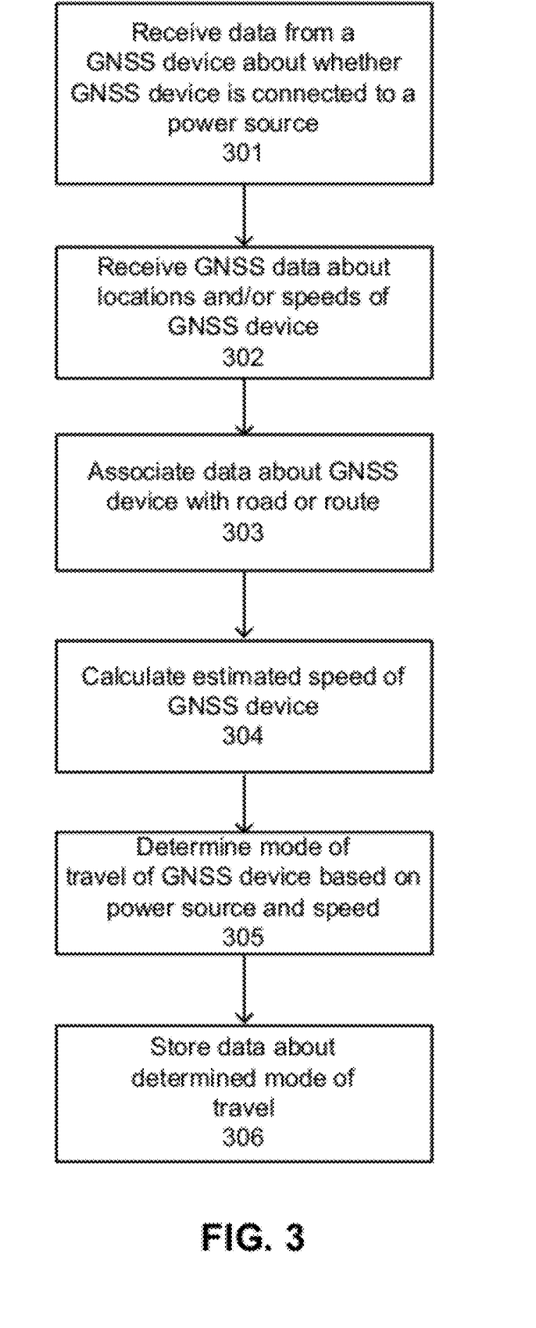
FIG. 3 is a flow diagram illustrating an example of a method of determining mode of travel of a GNSS device, in accordance with an embodiment of the invention.

FIG. 3 illustrates one example of the steps for determining a mode of travel for a GNSS device 110. In step 301, data is received 301 from a GNSS device 110 about whether the device is connected to a power source. The data can be gathered by a client-side application, for example, as a hardware level application programming interface (API) or an operating system (OS) API on a mobile device. Data is also received 302 about the locations and/or speeds of the GNSS device 110. The data about the locations and/or speeds can be associated 303 with a particular route, road, or location. As described above, the GNSS device 110 can provide the speed, or the data processing module 122 can calculate the speeds of the GNSS device 110 based on the locations of the device over a period of time. An estimated speed of the GNSS device can be calculated 304, as described above. Based on the connection of the GNSS device 110 to a power source and the average speed of the GNSS device 110, the mode of travel can be determined 305. For example, if the GNSS device 110 is connected to a power source and the estimated speed is approximately 35 mph, it can be determined that the GNSS device 110 is a vehicle. In another example, if there is no connection to a power source and the estimated speed of the device is 4 mph, then the user of the GNSS device 110 can be determined to be walking or using other non-vehicular modes. The mode of travel for the GNSS device 110 at the particular location or road is then stored 306.

Figure 4:
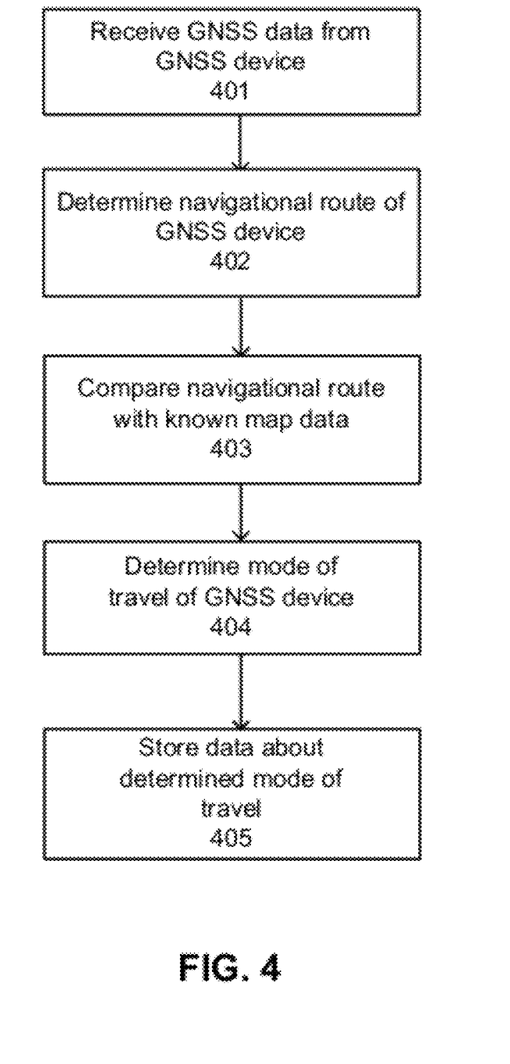
FIG. 4 is a flow diagram illustrating one example of a method of determining mode of travel of a GNSS device, in accordance with an embodiment of the invention.

FIG. 4 illustrates another example for determining a mode of travel for a GNSS device 110. In step 401, GNSS data is received from a GNSS device 110. Based on the locations of the GNSS device 110 received from a continuous period of time, the navigational route of the GNSS device 110 can be determined 402. The route traveled by the GNSS device 110 can be compared 403 with map data about the location of the GNSS device 110 or with a known navigational route. A mode of travel can be determined 404 based on the comparison of the traveled route with known map data. For example, if the navigational route of the GNSS device 110 follows the path of a known highway, then the mode of travel can be determined to be vehicular. If the navigational route of the GNSS device 110 follows a walking path or biking route, then the mode of travel can be determined as walking or biking. The mode of travel for the GNSS device 110 is then stored 405.

Figure 5:
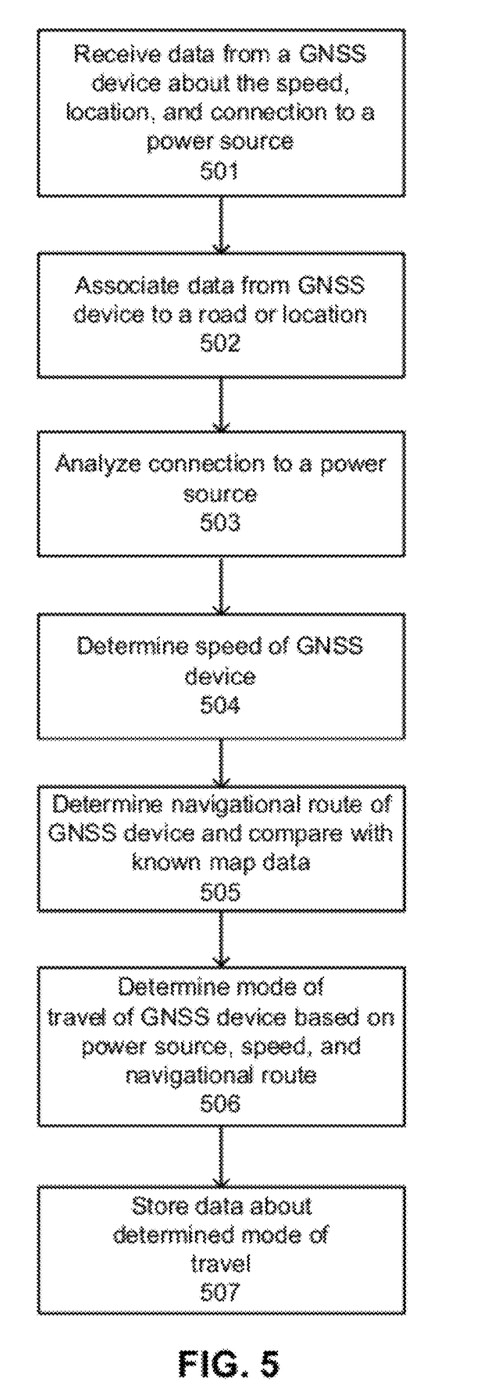
FIG. 5 is a flow diagram illustrating another example of a method of determining mode of travel of a GNSS device, in accordance with an embodiment of the invention.

FIG. 5 shows another example of determining a mode of travel for a GNSS device 110 based on analysis of multiple features of GNSS data. In step 501, data about the speed, location and connection to a power source are received from a GNSS device 110. The data is associated 502 with a road, location or route. The connection to a power source is analyzed 503, and the speed of the GNSS device is determined 504, based on methods described above. A navigational route of the GNSS device is determined 505 and compared with known map data about the road, route or location. Next, the mode of travel is determined based on the power source, speed, and navigational route of the GNSS device 110. The mode of travel for the GNSS device is then stored 507.

Applications of Mobile State Estimation

In various embodiments, the methods and systems described above can be applied to gather and deduce information about modes of travel, to create or edit maps, or to determine navigational routes for users.

Determining Speed and Traffic on Roads

In one embodiment, the modes of travel of a plurality of GNSS devices 110 can be used to determine the average speed on a particular road or route. Based on the methods described above, GNSS data can be used to determine the mode of travel of numerous GNSS devices 110 on a road segment and then determine the estimated speed of each of the GNSS devices 110 on the road. For example, if a certain number (or percentage) of GNSS devices 110 are associated with a particular road and the GNSS devices 110 have been determined to use vehicles as a mode of travel, the associated speeds of the GNSS devices 110 can be used to determine the average speed of the road.

In another embodiment, the amount of traffic on a particular road can be determined based on the modes of travel associated with the road. For example, if there are large numbers of GNSS data associated with a particular road, and the data are analyzed to determine that the mode of travel is mainly vehicular, it can be determined that the road is associated with heavy vehicular traffic. In another example, GNSS data can be used to determine that a particular road has low traffic volume because it is associated with a fewer number of GNSS devices 110 and/or many of the navigational routes of the GNSS devices 110 do not include the road as part of the travel route.

In some embodiments, the GNSS data must meet a high confidence threshold to be used for further analysis and applications. For example, if there are multiple features of the data from a GNSS device 110 that indicate that the device has a particular mode of travel, this GNSS data is considered to be of high confidence and can be used for traffic and navigational purposes. GNSS data that is ambiguous (e.g., data can indicate more than one mode of travel), cannot be associated with a road or road segment, or is otherwise unclear regarding the mode of travel can be considered to be low-confidence data and not used for traffic or navigational applications.

Determining Navigation Routes

In other embodiments, determined modes of travel for various GNSS devices 110 can be aggregated and analyzed to determine preferred routes of navigation for users. In some embodiments, the navigational routes analyzed from various modes of travel by GNSS devices 110 can be used to provide suggested routes of travel. For example, a route that is associated with numerous GNSS devices 110 that have used pedestrian mode of travel can indicate the presence of a walking path. Navigational routes taken by GNSS devices 110 using vehicular modes of travel can indicate a preferred road used by drivers.

In one embodiment, the navigational routes of the GNSS devices 110 can be used to provide directions for users. For instance, if numerous GNSS devices 110 are determined to use a vehicle as a mode of travel, and many of the GNSS devices 110 do not follow designated directions at a certain point on the route, this can indicate that a different route of travel is preferred by drivers at the location. This information can be used to determine a better navigational route for drivers. In another example, if numerous GNSS devices 110 that are determined to use a pedestrian mode of travel do not follow suggested directions for walking to a certain destination, this can indicate that the pedestrians prefer an alternate route. This information can be useful for providing better walking directions to a user. Thus, the determined modes of travel can be used to identify preferred routes for walking, biking, or driving.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A method for determining a mode of travel for a user of a location aware device, the method comprising:
receiving, by a computer system, data from a location aware device indicating locations of the location aware device at different times;
calculating, by the computer system, a travel speed of the location aware device based on the received data;
comparing, by the computer system, the calculated travel speed to a plurality of thresholds;
determining, by the computer system, a plurality of potential modes of travel of a user of the location aware device based on the calculated travel speed being included in at least two thresholds from the plurality of thresholds; and
responsive to determining the plurality of potential modes of travel, selecting, by the computer system from the plurality of potential modes of travel, a mode of travel of the user based on information received from the location aware device indicating whether the location aware device is connected to an external power source.

2. The method of claim 1, wherein the mode of travel is selected to be a vehicle if the information indicates that the location aware device is connected to the external power source.

3. The method of claim 1, wherein the mode of travel is selected to be non-motorized travel if the information indicates that the location aware device is not connected to the external power source.

4. The method of claim 1, wherein the information indicates that the location aware device is permanently connected to the external power source.

5. The method of claim 1, wherein the information indicates that the location aware device is temporarily connected to the external power source.

6. The method of claim 1, further comprising receiving data from the location aware device that indicates that the location aware device is held or carried by the user.

7. The method of claim 1, further comprising receiving data comprising a speed of the location aware device.

8. The method of claim 1, further comprising receiving data comprising an acceleration of the location aware device.

9. The method of claim 1, wherein the travel speed of the location aware device is estimated as a speed at a designated percentile in a probability distribution of speeds.

10. The method of claim 1, wherein the mode of travel is selected to be a vehicle if the calculated travel speed is greater than a threshold amount of a threshold from the plurality of thresholds and the information received from the location aware device indicates that the location aware device is connected to an external power source.

11. The method of claim 1, wherein the mode of travel is determined to be a bicycle if the calculated travel speed is between certain threshold amounts associated with thresholds from plurality of thresholds and the information received from the location aware device indicates that the location aware device is not connected to an external power source.

12. The method of claim 1, wherein the mode of travel is determined to be walking if the calculated travel speed is below a threshold amount of a threshold from the plurality of thresholds and the information received from the location aware device indicates that the location aware device is not connected to an external power source.

13. The method of claim 1, further comprising:
determining an acceleration of the location aware device; and
selecting the mode of travel of the user based on the acceleration and the received information indicating whether the location aware device is connected to an external power source.

14. The method of claim 1, further comprising:
determining a navigational route of the location aware device based on a plurality of locations of the location aware device; and
selecting the mode of travel of the user based on the determined navigational route and the received information indicating whether the location aware device is connected to an external power source.

15. The method of claim 14, wherein the mode of travel is selected to be a vehicle based on the navigational route following a highway.

16. The method of claim 14, wherein the mode of travel is selected to be walking based on the navigational route following a walking path.

17. The method of claim 14, further comprising determining a suggested travel route for the user based on the selected mode of travel.

18. The method of claim 17, wherein determining the suggested travel route is responsive to a request for directions from the user.

19. The method of claim 1, wherein the travel speed of the location aware device is calculated based on an average speed of a road, the average speed of the road determined based on speeds of a plurality location aware devices.

20. The method of claim 1, wherein the location aware device determines the locations of the location aware device at different times using a geospatial satellite system.

21. The method of claim 1, wherein the location aware device determines the locations of the location aware device at different times using a location based service.

22. The method of claim 1, wherein the location aware device determines the locations of the location aware device at different times using dead reckoning.

23. The method of claim 1, wherein the plurality of potential modes of travel of the user include a vehicle travel mode and a biking travel mode.

24. A non-transitory computer-readable storage medium storing executable computer program instructions for determining a mode of travel for a location aware device, the computer program instructions comprising instructions for:
receiving data from a location aware device indicating locations of the location aware device at different times;
calculating a travel speed of the location aware device based on the received data;

comparing the calculated travel speed to a plurality of thresholds;

determining a plurality of potential modes of travel of a user of the location aware device based on the calculated travel speed being included in at least two thresholds from the plurality of thresholds; and responsive to determining the plurality of potential modes of travel, selecting, from the plurality of potential modes of travel, a mode of travel of the user based on information received from the location aware device indicating whether the location aware device is connected to an external power source.

25. The computer-readable storage medium of claim 24, wherein the mode of travel is selected to be a vehicle if the information indicates that the location aware device is connected to the external power source.

26. The computer-readable storage medium of claim 24, wherein the mode of travel is selected to be non-motorized travel if the information indicates that the location aware device is not connected to the external power source.

27. The computer-readable storage medium of claim 24, wherein the information indicates that the location aware device is permanently connected to the external power source.

28. The computer-readable storage medium of claim 24, wherein the information indicates that the location aware device is temporarily connected to the external power source.

29. The computer-readable storage medium of claim 24, further comprising receiving data from the location aware device that indicates that the location aware device is held or carried by the user.

30. The computer-readable storage medium of claim 24, further comprising receiving data comprising a speed of the location aware device.

31. The computer-readable storage medium of claim 24, further comprising receiving data comprising an acceleration of the location aware device.

32. The computer-readable storage medium of claim 24, wherein the travel speed of the location aware device is estimated as a speed at a designated percentile in a probability distribution of speeds.

33. The computer-readable storage medium of claim 24, wherein the mode of travel is selected to be a vehicle if the calculated travel speed is greater than a threshold amount of a threshold from the plurality of thresholds and the information received from the location aware device indicates that the location aware device is connected to an external power source.

34. The computer-readable storage medium of claim 24, wherein the mode of travel is selected to be a bicycle if the calculated travel speed is between certain threshold amounts associated with thresholds from plurality of thresholds and the information received from the location aware device indicates that the location aware device is not connected to an external power source.

35. The computer-readable storage medium of claim 24, wherein the mode of travel is determined to be walking if the calculated travel speed is below a threshold amount of a threshold from plurality of thresholds and the information received from the location aware device indicates that the location aware device is not connected to an external power source.

36. The computer-readable storage medium of claim 24, further comprising:

determining an acceleration of the location aware device; and selecting the mode of travel of the user based on the acceleration and the received information indicating whether the location aware device is connected to an external power source.

37. The computer-readable storage medium of claim 24, further comprising:

determining a navigational route of the location aware device based a plurality of locations of the location aware device; and selecting the mode of travel of the user based on the determined navigational route and the received information indicating whether the location aware device is connected to an external power source.

38. The computer-readable storage medium of claim 37, wherein the mode of travel is selected to be a vehicle based on the navigational route following a highway.

39. The computer-readable storage medium of claim 37, wherein the mode of travel is selected to be walking based on the navigational route following a walking path.

40. The computer-readable storage medium of claim 37, further comprising determining a suggested travel route for the user based on the selected mode of travel.

41. The computer-readable storage medium of claim 40, wherein determining the suggested travel route is responsive to a request for directions from the user.

42. The computer-readable storage medium of claim 24, wherein travel speed of the location aware device is calculated based on an average speed of a road, the average speed of the road determined based on speeds of a plurality location aware devices.

43. The computer-readable storage medium of claim 24, wherein the location aware device determines the locations of the location aware device at different times using a geospatial satellite system.

44. The computer-readable storage medium of claim 24, wherein the location aware device determines the locations of the location aware device at different times using a location based service.

45. The computer-readable storage medium of claim 24, wherein the location aware device determines the locations of the location aware device at different times using dead reckoning.

46. The computer-readable storage medium of claim 37, wherein the plurality of potential modes of travel of the user include a vehicle travel mode and a biking travel mode.

47. A computer system for determining a mode of travel for a location aware device, the system comprising:

a computer processor; and a computer program executable by the computer processor and performing actions comprising:

receiving data from a location aware device operated by a user;

calculating a speed at which the location aware device is traveling based on the received data;

determining one or more potential modes of travel of the user based on the calculated speed;

responsive to the calculated speed being attributable to a plurality of modes of travel, selecting a mode of travel of the user from the plurality based on information received from the location aware device indicating whether the location aware device is connected to an external power source, the plurality of modes of travel including a vehicle travel mode and a biking travel mode;

determining a suggested travel route for the user based on the selected mode of travel; and transmitting information associated with the suggested travel route to the location aware device.

48. The system of claim 47, wherein the vehicle travel mode is selected if the information indicates that the location aware device is connected to the external power source.

49. The system of claim 47, wherein the biking travel mode is selected if the information indicates that the location aware device is not connected to the external power source.

50. The system of claim 47, wherein the information indicates that the location aware device is permanently connected to the external power source.

51. The system of claim 47, wherein the information indicates that the location aware device is temporarily connected to the external power source.

52. The system of claim 47, further comprising receiving data from the location aware device that indicates that the location aware device is held or carried by the user.

53. The system of claim 47, wherein the travel speed of the location aware device is calculated based on a probability distribution of speeds.

54. The system of claim 47, wherein the vehicle travel mode is selected based on the information indicating that the location aware device is connected to an external power source and determining that a navigational route of the location aware device follows a highway.

55. The system of claim 47, wherein the biking travel mode is selected based on the information indicating that the location aware device is connected to an external power source and determining that a navigational route follows a biking path.

56. The system of claim 47, wherein the suggested travel route is determined responsive to a request for directions from the user.

57. The system of claim 47, wherein the speed of the location aware device is calculated based on an average speed of a road, the average speed of the road determined based on speeds of a plurality of location aware devices.

58. The system of claim 47, wherein the speed is calculated based on location information of the location aware device, the location aware device determining the location information using a geospatial satellite system.

59. The system of claim 47, wherein the speed is calculated based on location information of the location aware device, the location aware device determining the location information using a location based service.

60. The system of claim 47, wherein the speed is calculated based on location information of the location aware device, the location aware device determining the location information using dead reckoning.

* * * * *

UNITED STATES PATENT AND TRADEMARK OFFICE
CERTIFICATE OF CORRECTION

PATENT NO. : 8,886,457 B2  
APPLICATION NO. : 13/077708  
DATED : November 11, 2014  
INVENTOR(S) : Eli U. Brandt

It is certified that error appears in the above-identified patent and that said Letters Patent is hereby corrected as shown below:

Column 14, line 47, after "speeds of a plurality" insert --of--.

Column 16, line 8, after "device based" insert --on--.

Column 16, line 29, after "speeds of a plurality" insert --of--.

Signed and Sealed this
Twelfth Day of January, 2016

Michelle K. Lee
*Director of the United States Patent and Trademark Office*